United States Patent [19]

Spigarelli

[11] 4,077,467
[45] Mar. 7, 1978

[54] METHOD AND APPARATUS FOR SOLDERING, FUSING OR BRAZING

[76] Inventor: Donald J. Spigarelli, 148 Rutland St., Carlisle, Mass. 01741

[21] Appl. No.: 652,984

[22] Filed: Jan. 28, 1976

[51] Int. Cl.$^2$ .............................................. F28D 15/00
[52] U.S. Cl. ......................................... 165/105; 34/27; 134/107; 202/170; 228/180 R; 228/249
[58] Field of Search ............... 228/180 R, 249; 34/27; 134/107; 202/170; 165/105; 29/498

[56] References Cited

U.S. PATENT DOCUMENTS

| 3,866,307 | 2/1975 | Pfahl | 228/249 |
| 3,904,102 | 9/1975 | Chu | 228/180 R |

Primary Examiner—Charles J. Myhre
Assistant Examiner—Daniel J. O'Connor
Attorney, Agent, or Firm—Robert F. O'Connell

[57] ABSTRACT

An apparatus for soldering an article which is placed within a first confined region in hot saturated vapors of a primary high temperature liquid. The vapors condense on the article to heat the article for such purpose. A second body of hot saturated vapors of a secondary liquid having a lower boiling point and density than the primary liquid provides a secondary vapor blanket in a second confined region of the apparatus which causes the primary vapors to condense and return to a primary liquid reservoir so that their escape from the apparatus is prevented. The temperature of the secondary liquid is controlled independently of the primary liquid.

Preferably, the apparatus is such that the article is sequentially inserted into the first and second confined regions and sequentially removed therein, the article remaining in each of the regions temporarily during which times the regions are prevented from communication with each other and with the ambient atmosphere so that an effective vapor-lock operation occurs. The article may be pre-heated to a higher temperature than that of the secondary vapors before insertion therein to prevent undesirable flux removal before soldering takes place. The primary and secondary liquids and flux remaining on the article after soldering can be removed by spraying the article with distilled secondary liquid as it passes through the secondary vapors on the removal of the article from the apparatus.

11 Claims, 5 Drawing Figures

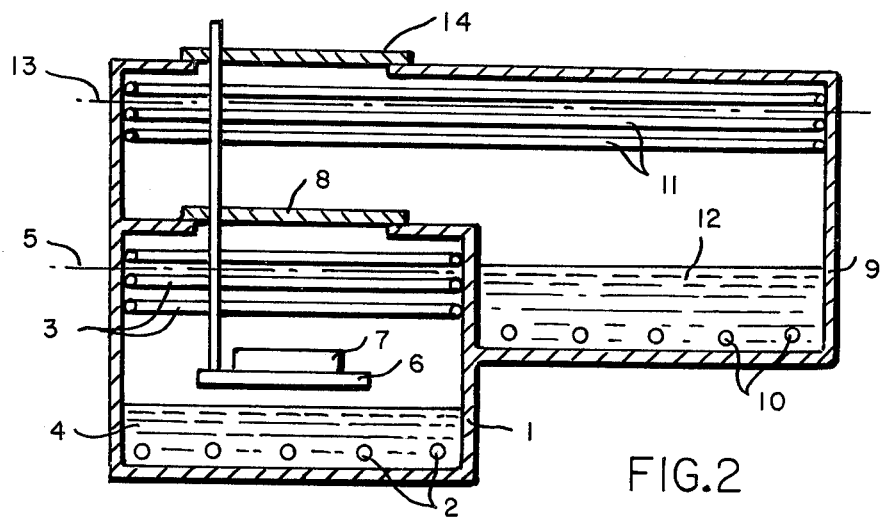
PRIOR ART
FIG. 1
FIG. 2
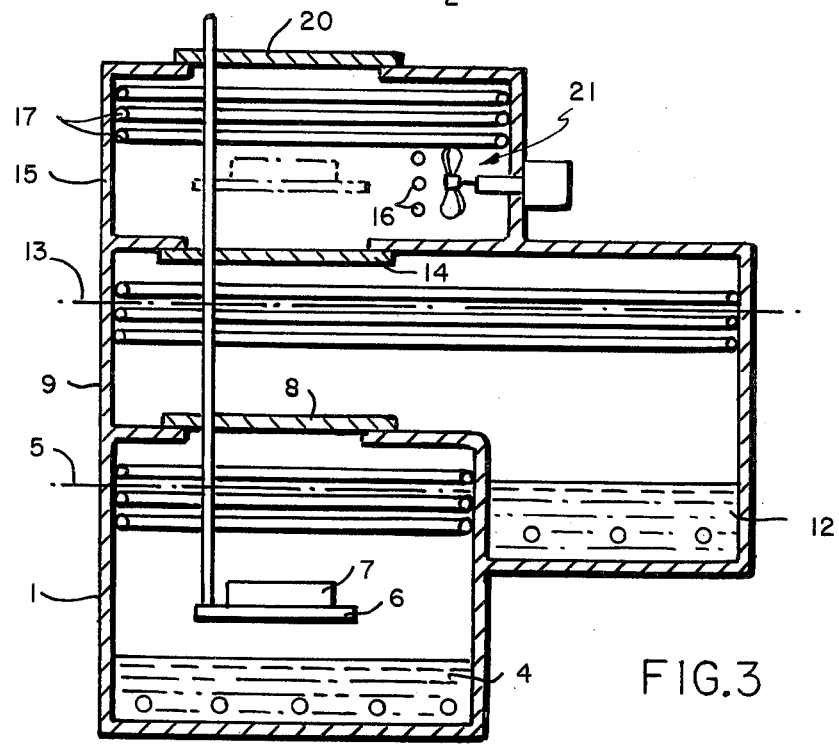
FIG. 3

METHOD AND APPARATUS FOR SOLDERING, FUSING OR BRAZING

INTRODUCTION

This invention relates generally to methods and apparatus for the soldering, fusing or brazing of articles and, more particularly, to the use of hot, saturated vapors for such purposes.

BACKGROUND OF THE INVENTION

Conventional methods for soldering, fusing or brazing articles are generally not appropriate when a large number of such operations are to be performed rapidly, as in a mass production process. Thus, for example, when mass soldering printed circuit boards having many closely spaced connections, conventional soldering iron techniques are of little use when rapid soldering must be done.

One method and apparatus which has been suggested for such purpose is described in U.S. Pat. No. 3,866,307, issued on Feb. 18, 1975 to Pfahl, Jr. et al. wherein the article to be soldered, fused or brazed is placed in hot saturated vapors generated by continuously boiling a heat transfer liquid having selected properties, including a boiling point at least equal to, and preferably above, the temperature required for a soldering, brazing or fusing operation. The vapors condense on the article and given up latent heat of vaporization to heat the article to the temperature needed for soldering, fusing or brazing. To implement such a process an apparatus for performing the desired operation can be arranged to permit a single article, a batch of articles, or a continuously moving line of articles to be subjected to hot saturated vapors in a suitable enclosure. The heat transfer liquid, for example, may be selected from a group of liquids known generically as fluorocarbons.

In a particular apparatus described in the above-referenced patent, the hot saturated vapors from the boiling heat transfer liquid of the enclosure substantially fill the enclosure. Because the fluorocarbon liquids which are used as the heat transfer liquids in such systems are relatively expensive, it is desirable to prevent the escape of any fluorocarbon vapors from the system so that substantially all of the vapors are condensed and returned to the liquid supply. Accordingly, the height of the vessel shown in the patent in which such operation takes place must be sufficiently large that the maximum level of the saturated vapors does not reach the open end of the vessel shown therein. If the enclosure is too small a substantial portion of the vapors will escape.

An improvement for reducing vapor loss in such apparatus, is disclosed in U.S. Pat. No. 3,904,102 issued to Chu et al. on Sept. 9. 1975, which patent discloses the introduction of a secondary vapor blanket in the enclosure between the primary vapors formed from the boiling heat transfer liquid of the embodiment of U.S. Pat. No. 3,866,307 and the ambient atmosphere. The primary and secondary vapors are supplied from a mixture of primary and secondary liquids in the same reservoir, the secondary vapors boiling off first at a lower temperature and filling the upper portion of the open enclosure and the more dense primary vapors which boil at a higher temperature filling the lower portion thereof. While the use of such a secondary vapor blanket tends to reduce the vapor losses therefrom, some vapors of both the primary and secondary liquids still tend to be irretrievably lost to the atmosphere from such an open system. The height of the system, while reduced somewhat from that in the Pfahl et al. patent, still has to be so large that the use of the system in many applications becomes impossible or at least highly impractical. Further, there is substantially no control of the rate of generation of the secondary vapor because the temperature of the secondary liquid cannot be controlled independent of that of the primary liquid, since a mixture of the two liquids in a common reservoir is required. As the secondary vapors from the primary/secondary liquid mixture are formed, they tend to become super heated to temperatures higher than the boiling point of the secondary liquid, the super heated secondary vapor blanket thereby tending to be less dense than it would be if such super heating did not occur. The effectiveness of the secondary vapor blanket in preventing the escape of primary vapors therethrough is accordingly not optimized. Morever, the use of an open enclosure system caused an unreasonable loss of both the primary and the secondary vapors and a consequent reduction in the overall effectiveness of the system.

Even if a lid is placed on the top of the enclosure in such a system, escape of both vapors from the system will occur when the lid is removed to permit insertion of the article to be treated, particularly where the area of the opening is relatively large.

In order to overcome the disadvantages of the above systems, it is desirable that a hot saturation vapor apparatus for soldering, fusing or brazing articles be designed so that its overall height can be minimized without reducing the efficiency of the device, i.e., while still substantially preventing the escape of any expensive fluorocarbon capors therefrom. It is further desirable that initial manufacturing and installation costs, as well as the continuing operating and maintenance costs of the apparatus be kept to reasonable levels.

BRIEF SUMMARY OF THE INVENTION

In accordance with the invention, a hot saturated vapor system of a closed, vapor-lock configuration is provided wherein the overall height of the apparatus is minimized to permit it to be utilized where space is at a premium. Losses of vapor are minimized by diffusion of such vapors substantially only within the overall closed system. In accordance with a particular embodiment of the invention, for example, a secondary vapor blanket of lower temperature vapors is produced from a reservoir of a secondary liquid which is separate from that of the primary liquid. In this way, control of the temperature of the secondary liquid can be achieved independently of that of the primary liquid. Hence, the secondary vapors which are produced can be maintained at a temperature substantially at or near the boiling point of the secondary liquid so that secondary vapor super heating is avoided and a vapor blanket of relatively high density is produced to minimize the loss of vapors of the primary heat transfer fluid.

By the use of a closed system in a preferred embodiment wherein the primary and secondary vapors are placed in separate confined regions or chambers, none of which are normally in communications with each other or with the ambient atmosphere, vapor loss of the secondary vapors, as well as the primary vapors, is even further reduced. In the use thereof, the article to be processed by the system can be sequentially placed in each of the confined regions, which during each successive sequential placement are closed off from each other and from the atmosphere, using an appropriate sequence of vapor lock operations, as described in more detail below. Such a closed system permits a substantial reduction in the overall height of the system while minimizing the primary and secondary vapor losses therein. In a further embodiment of the invention, appropriate pre-heating techniques are used so that the article to be treated is transported to the primary vapors through the intermediate blanket of secondary vapors without being affected thereby, the removal of flux placed on the product to promote the flow of solder or brazing material being prevented by such pre-heating from removal by the intermediate secondary vapor blanket.

The secondary or intermediate vapor blanket chamber in a still further embodiment of the invention can also be provided with a high pressure spray rinse which washes off, and thereby conserves, any primary heat transfer fluid which may have condensed thereon and further washes off any flux which may be left on the product after it has been processed in the primary heat transfer vapors. In a still further embodiment of the invention, an additional drying chamber can be utilized to conserve the vapors of the secondary fluid in the secondary vapor chamber.

In still another embodiment of the invention, means are provided for continuously cleaning the secondary vapor chamber fluid reservoir and the heat transfer fluid reservoir in order to minimize maintenance of the apparatus.

More specific descriptions of the various embodiments of the invention are described with the assistance of the accompanying drawings wherein:

FIG. 1 shows a partial sectional view in elevation of an apparatus substantially similar to that shown by the prior art;

FIG. 2 shows a sectional view of an embodiment of the invention which depicts a closed system utilizing a closed high temperature primary vapor chamber and a closed secondary vapor chamber;

FIG. 3 shows a sectional view of another embodiment of the invention which depicts a closed system of the type shown in FIG. 2 with an additional closed chamber for pre-heating and drying;

Figure 4:
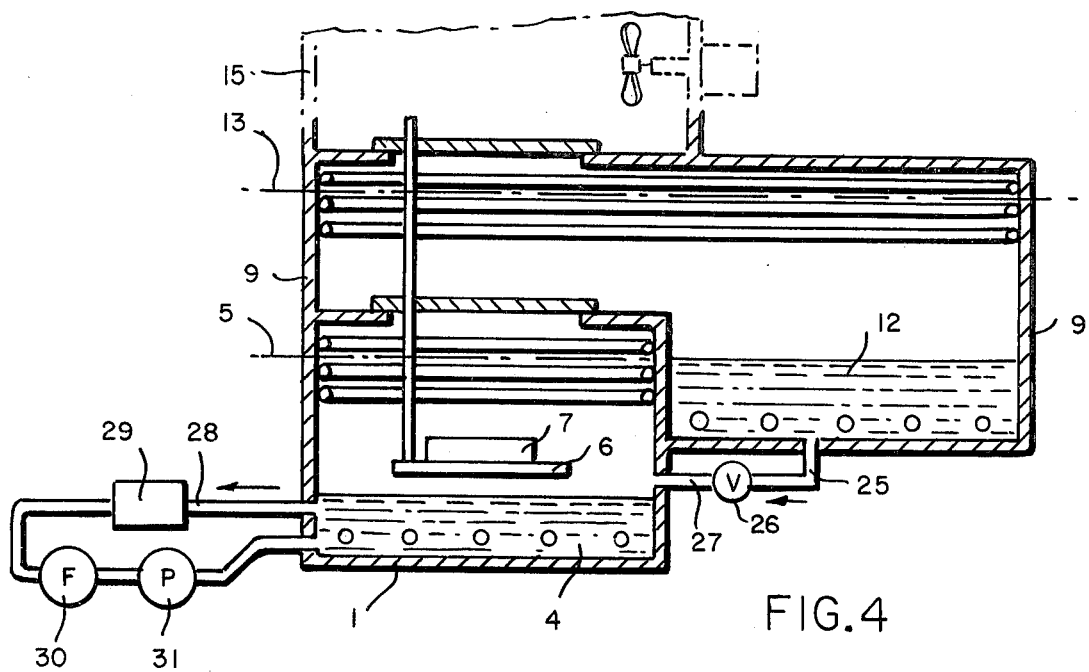
Figure 5:
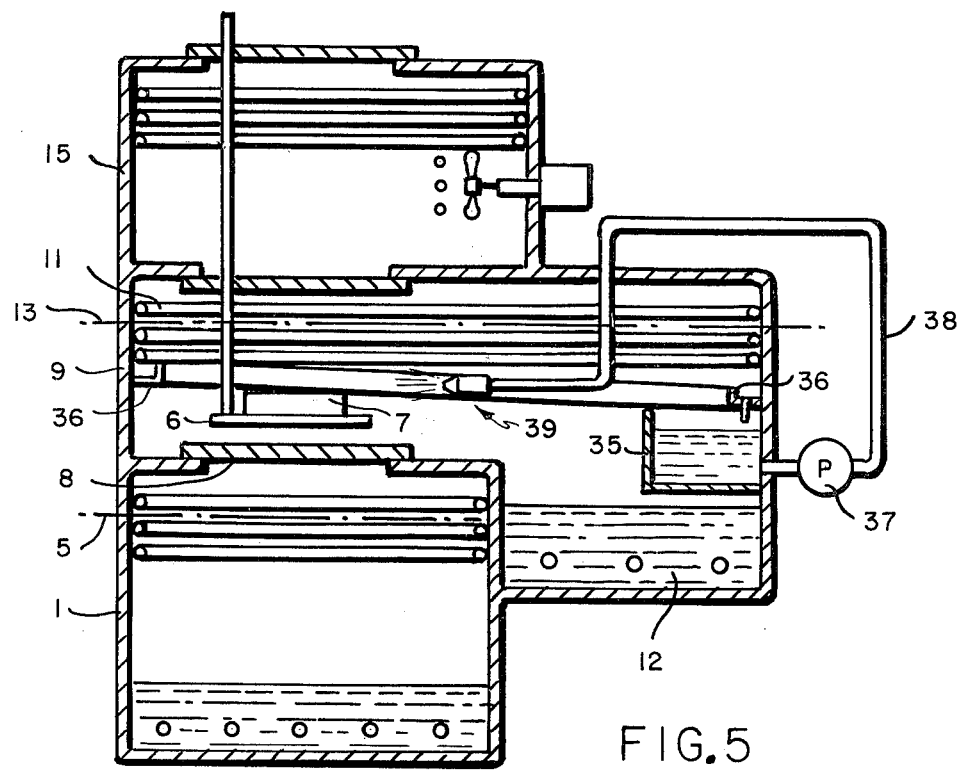

FIG. 4 shows a sectional view of still another embodiment of the invention which depicts a closed system utilizing techniques for continuously cleaning the reservoirs in both the secondary vapor chamber and high temperature primary vapor chamber; and FIG. 5 shows a sectional view of still another embodiment of the invention which depicts a closed system utilizing techniques for providing an integral spray rinse in the secondary vapor chamber.

As can be seen in FIG. 1, a conventional apparatus for soldering an article by utilizing hot saturated vapors, of the general type shown, for example, in the above U.S. patent of Pfahl, Jr. et al. comprises an enclosure 1 into which an article 7 which is to be soldered, for example, can be placed on a movable platform 6, the article passing into and out of the enclosure 1 via the opening at the top thereof. Appropriate means (not shown) for raising and lowering the platform 6, for example, can be devised by those in the art.

A reservoir of heat transfer liquid 4 is present in the lower portion of enclosure 1 and is provided with heating coils 2, which may be electrically operated, adjacent the lower end thereof. Cooling coils 3 are mounted near the upper end of enclosure 1 and receive an appropriate circulating coolant from any suitable source (not shown). Heat transfer liquid 4 which is introduced to the enclosure 1 to the level indicated is brought to and maintained at its boiling point by means of heating coils 2. The hot saturated vapors from the boiling heat transfer liquid 4 substantially fill the enclosure 1 up to a level which is approximately at the level of cooling coils as depicted by phantom line 5. When the vapors reach the cooling coils the latter elements cause the vapors to condense and the condensate so formed drains downwardly to the lower portion of the enclosure into the reservoir 4. The upper level of most of the hot saturated vapors can be substantially maintained at or near the level 5 since such vapors are more dense than air and since most of the vapors tend to be cooled and condensed by the cooling coils when they reach the level 5. However, some of the vapors may rise above level 5 and escape from the opening at the top of enclosure 1.

In order to provide an effectively operating system wherein such level 5 remains substantially at a position below the top of the enclosure, as shown in FIG. 1, the height of the enclosure must be relatively large, as high as 25 feet or more. If the height is much below such value vapors will tend to substantially fill the entire enclosure and to diffuse through the cooling coils well above the level 5 so that a substantial amount of such vapors will be able to escape therefrom. The use of an enclosure of such size is not only an inconvenience to the users of such systems but, in some cases, is either impossible to use or can require the users to build specially designed rooms in order to position the apparatus. It is desirable, therefore, that the height of such apparatus be considerably reduced so that they can fit into standard size rooms at most facilities and can be conveniently installed therein without extensive redesign of the locations in which they are to be placed.

The system of FIG. 1 can be improved somewhat by the use of a secondary liquid, mixed with the primary liquid in reservoir 4, as discussed in the above U.S. patent of Chu et al. In such a system, the secondary liquid forms a secondary vapor blanket above the primary blanket within the open vessel 1. No means is provided for separately controlling the temperature of the secondary liquid and, hence, the rate of secondary vapor generation and the super heating of the latter, due to its being subjected to the higher temperatures required to generate the primary vapors from the same liquid reservoir, provides a secondary vapor blanket which is less dense than is desirable for preventing escape of primary vapors therethrough. Moreover, the open vessel permits not only secondary vapors to escape but also those portions of the primary vapors which pass therethrough. To prevent this escape, the height of the vessel again must be relatively great and, even with such dimensions, the prevention of vapor loss is not optimally minimized.

The system depicted in FIG. 2 in accordance with the invention provides a system in which the overall height is considerably reduced from that which is normally required for a system of the type shown in FIG. 1 while the vapor losses are minimized to a greater extent than the systems of the prior art. For convenience, the reference numerals of FIG. 2 are retained for elements used therein similar to those shown in FIG. 1. As seen therein, a further separate enclosure 9 forms a second chamber above that formed by enclosure 1. Enclosure 1 has a cover, or door, member 8 and enclosure 9 has a cover member 14, each of which can be opened or closed to provide access to the enclosure by an article 7 on moveable platform 6. A second reservoir 12 of a secondary liquid having a boiling point which is lower than that of the primary liquid 4 is formed separately from reservoir 4 of enclosure 1 in the lower part of a portion of enclosure 9 which is remote from the door opening of enclosure 1 as shown therein. A plurality of heating coils 10 for heating such secondary liquid independently of the heating of the primary liquid are mounted within the reservoir 12 in substantially the same manner as heating coils 2 are mounted within the reservoir 4. A plurality of cooling coils 11 having an appropriate coolant circulating therethrough are mounted near the top of enclosure 9 in a manner similar to that for cooling coils 3 within enclosure 1 so that the level of vapors from secondary fluid 12 extends to the phantom line 13 within enclosure 9.

Thus, when heating elements 10 are operated, the secondary fluid 12 is caused to boil thereby providing secondary vapors which substantially fill the chamber of enclosure 9 up to level 13 at the condensing coils 11. Such vapors, in effect, form a vapor blanket which, because the boiling point of the secondary fluid 12 is lower than that of the primary fluid 4, is formed at a lower temperature than the vapors formed in the chamber of the higher temperature enclosure 1. The vapor blanket formed by the boiling of secondary fluid 12 prevents the escape of high temperature primary vapors from enclosure 1 when door 8 is opened because the high temperature vapors which are diffusing, or otherwise entering, the secondary chamber of enclosure 9 are condensed by the lower temperature vapors, the condensate, for the most part, being caused to return to the enclosure 1 and the reservoir 4 therein.

The doors 14 and 8 are opened sequentially to permit the article to be treated by the system. Thus, the article is first placed in enclosure 9 at which time the door 14 is closed, the article being permitted to remain temporarily therein. Door 8 is then opened and the article is loaded into enclosure 1. The lower temperature vapor blanket in enclosure 9 prevents the high temperature vapors of enclosure 1 from escaping during the latter loading process when door 8 is opened. After the soldering has taken place, sequential opening of doors 8 and 14 in the same manner in reverse permits the article to be removed through enclosure 9 and out from the apparatus again without the loss of any high temperature primary vapors from enclosure 1. While some loss of the lower temperature secondary vapors in enclosure 9 may occur only when door 14 is opened to the ambient atmosphere, the secondary liquid used therein can be selected from a variety thereof which are much cheaper than the relatively expensive fluorocarbons utilized in enclosure 1 and, therefore, any such losses which may occur are of less significance and the overall cost of operation and maintenance of the system is reduced considerably. Because of the presence of the secondary vapor blanket formed in a separate enclosure 9 and because of the use of a closed system, the overall apparatus can have a much reduced height compared to that of the enclosures used in the above discussed patents and substantially less of the high temperature primary vapors as well as the secondary vapors, are permitted to escape from the system. The overall height of an apparatus of the type shown in FIG. 2 can be reduced considerably in the order of about 4–5 feet, or less, as compared to that of FIG. 1.

Further, because the temperature of the secondary liquid is controlled independently of that of the primary liquid, super heating of the secondary vapors is prevented and the density of the secondary vapor blanket can be optimized so that it operates more effectively to prevent the escape of primary vapors therethrough.

In accordance with a preferred embodiment of the invention, for example, the primary high temperature liquid in enclosure 1 may be of the class known as fluorocarbon liquids such as FREON E5, a fluorinated polyoxypropylene sold under that trademark designation by E. I. duPont de Nemours & Co. or FLUORINERT FC-70 sold under that designation by the 3-M Company. The secondary fluid in enclosure 2 may be, for example, FREON TF or FREON TE, also sold by E. I. duPont de Nemours & Co. or any similar liquid having a lower boiling point and density than that of the primary liquid.

FIG. 3 shows an alternative embodiment of the closed system shown in FIG. 2 which includes the addition of a further enclosure 15 which is utilized for pre-heating and drying purposes, as described below. Enclosure 15 has a suitable cover, or door, member 20 which may be similar to those used with enclosure 1 and 9. A plurality of heating coil elements 16 are mounted within enclosure 15 for radiating heat throughout the chamber formed thereby. An appropriate recirculating fan 21 may be utilized for assisting in the circulation of the radiant heat therefrom. Cooling coils 17 are mounted in the upper portion of enclosure 15 for purposes described in more detail below.

When the door 20 is opened and the article 7 is initially placed within the pre-heating chamber 15, the article and the flux associated therewith for a soldering process, for example, is heated to a temperature in excess of the boiling point of the secondary vapors in the intermediate secondary vapor chamber enclosure 9. When the article is subsequently passed through door 14 into chamber 9 the article which is so heated is at a sufficiently high temperature that it can thereupon pass through the intermediate secondary vapors without the latter vapors condensing onto the article and flux material. If the vapor material is of a type in which the flux material is soluble, condensation of the vapors thereof will tend to dissolve at least a portion of the flux material and prevent the effectiveness of the soldering operation. Thus, the use of such a pre-heating chamber prior to entry of the article into intermediate chamber of enclosure 9 permits the use of a very wide range of intermediate vapors including those which are compatible with the high temperature fluid primary liquid 4 and in which the flux may be soluble. Accordingly, the pre-heating chamber of enclosure 14 in FIG. 3 permits the article and flux material present thereon to be passed through the intermediate vapor blanket on its way into the high temperature primary chamber of enclosure 1 without removal of the flux. Further, the liquid and vapors in the intermediate chamber of enclosure 9 can be selected so that they tend to remove the flux which remains on the article after soldering, fusing or brazing has taken place in the high temperature primary chamber. Thus, the article after removal from enclosure 1 tends to be cooled as it passes through the intermediate secondary vapor blanket of enclosure 9 so that at least a portion of the flux tends to be dissolved in the secondary vapors and removed from the article. Doors 14 and 20 are closed and the treated article is stopped in the chamber of enclosure 14 so that the heaters 16 can heat the surface of the article for drying thereof, i.e., condensed secondary vapor which may be present thereon is vaporized and such vapors then pass upward to cooling coils 17 where they are condensed and returned to the lower portion of chamber 14 and thence through the door 14, when subsequently opened, to permit such condensed vapors to return to the reservoir 12 in enclosure 9. After such drying process, door 20 can be opened to allow the article to be passed therethrough.

In the embodiment disclosed in FIG. 4, means are provided for cleaning the liquid reservoirs in the high temperature chamber of enclosure 1 and in the intermediate chamber of enclosure 9. Since most flux materials are soluble in the fluid of the intermediate secondary vapor, when the product is rinsed in the intermediate vapor zone, both flux and condensed secondary vapor, as well as some condensed primary vapor, are all carried back into the reservoir 12. The flux which is so carried back can accumulate in reservoir 12 and utlimately reduce the effectiveness of the intermediate liquid as a flux remover. Consequently, in order to maintain the intermediate liquid effectiveness, a periodic cleaning of a mixture of secondary liquid, flux, and condensed primary vapor in reservoir 12 is desirable.

Accordingly, the reservoir liquid 12 is continuously or periodically, drained through a drainage line 25 which can be controlled by a valve 25, the drained liquid thereby entering into the high temperature reservoir 14 via drainage pipe 27. The lower vapor temperature secondary liquid component from reservoir 12 is vaporized in the high temperature chamber of enclosure 1 and the vapors pass through opened door 8 into the immediate chamber of enclosure 9 where they are appropriately condensed for return to reservoir 12. Because of the properties of the high temperature fluorocarbon liquids in reservoir 4 the flux which is drained thereinto from reservoir 12 via the drainage pipe 27 is not soluble therein and, accordingly, remains in suspension in reservoir 4.

Such mixture of high temperature liquid and suspended flux is thereupon drained from reservoir 4 via drainage line 28 into a suitable cooling chamber 29, the flux thereby becoming solidified in suspension. The solidified flux is filtered out by an appropriate filter device 30 in drainage line 28 at the output side of coolind chamber 29. The remaining high temperature liquid which is passed through filter 30 is thereupon pumped back into reservoir 4 by an appropriate pump 31 in drainage line 28 at the output side of filter 30.

In such a structure, there can be either a continuous, or periodic, cleaning and restoration of the liquids in reservoirs 4 and 12, with an appropriate cleaning of high temperature condensed vapors and flux from intermediate reservoir 12 and a suitable cleaning of intermediate secondary vapors and flux from high temperature reservoir 4.

The cleaning and drainage structures of FIG. 4 can be utilized with either of the embodiments of FIGS. 2 and 3, i.e., with or without the pre-heating chamber 15 the latter being shown in phantom in FIG. 4.

A further embodiment of the invention for providing more effective removal of flux from the article once the soldering, fusing or brazing operation has been completed is depicted in FIG. 5. The apparatus therein further includes means for forming a distillate reservoir 35 in the intermediate chamber of enclosure 9. Intermediate secondary liquid which is boiled from reservoir 12 effectively saturates the volume of the intermediate chamber of enclosure 9 approximately up to the phantom line 13 and is appropriately condensed by condensing coils 11 therein and a portion thereof in the form of a clean distilled vapor at the level of the cooling coils 11 is condensed along the walls of the chamber and is collected in drain channels 35 mounted therealong. The drain channels 36 return the condensed intermediate secondary liquid to the distillate reservoir 35, as shown therein. Such distillate is pumped from distillate reservoir 35 by an appropriate pump 37 placed in a line 38 which carries it to a spray device 39 having one or more spray nozzles. When the article has been processed in the high temperature chamber of enclosure 1 and is transported into the intermediate chamber of enclosure 9 by opening and then closing door 8 behind the product load, the saturated vapors in the intermediate chamber of enclosure 9 cool the article which has been so processed. After the article is cooled to a satisfactory temperature a distillate spray rinse from spray device 39 is initiated, the cleaned distilled liquid from distillate reservoir 35 being pumped thereto for such purpose. The spray of clean distilled liquid rinses off any flux present on the article 7 as well as any high temperature liquid which may be on the article or the platform 6. The liquid and flux are thereupon carried off by the spray and drained into reservoir 12. Such structure can be utilized as shown in FIG. 5 with a pre-heat chamber 15 or with the pre-heat chamber removed as in FIG. 2. By providing a closed system and a spraying sub-system as shown in FIG. 5, a more complete conservation of both primary and secondary vapors and a more complete removal of flux is provided.

What is claimed is:
1. An apparatus for heating an article and material on said article at an elevated temperature to melt said material, said apparatus comprising a first enclosure having a first reservoir of a first liquid located therein;

means in said first enclosure for heating said first liquid in said reservoir to a first temperature at which said liquid boils, said temperature being equal to said elevated temperature and at least equal to the melting point of said material to form a first body of saturated vapors of said first liquid at said elevated temperature in said first enclosure;

a second enclosure having means for communicating with said first enclosure and having a second reservoir of a second liquid located therein, said second liquid having a boiling point temperature which is lower than that of said first liquid;

means in said second enclosure for heating said second liquid to a second temperature at its said boiling point temperature independently of the heating of said first liquid to form a second body of saturated vapors of said second liquid in said second enclosure;

movable means for inserting said article sequentially into said second body of saturated vapors and said first body of saturated vapors, vapor from said first body of saturated vapors thereby condensing on said article and said material thereon to heat said article and said material to said elevated temperature by transfer of latent heat of vaporization from said condensed vapor to said article and material whereby said material is melted;

said movable means also for removing said article sequentially from said first body of saturated vapors and said second body of saturated vapors;

said second body of saturated vapors in said second enclosure acting as means for condensing vapors from said first body of saturated vapors which are present in said second enclosure when said enclosures are in comminucation, at least a portion of said condensed vapors returning to said first enclosure from said second enclosure.

2. An apparatus in accordance with claim 1 and further including
first closure means for permitting communication between or closure of communication between said first and said second enclosure; and
second closure means for permitting communication between or closure of communication between said second enclosure and the ambient atmosphere.

3. An apparatus in accordance with claim 2 and further including
first cooling means in said first enclosure for condensing vapors from said first body of saturated vapors therein, said condensed vapors returning to said first reservoir; and
second cooling means in said second enclosure for condensing vapors from said second body of saturated vapors therein, said condensed vapors returning to said second reservoir.

4. An apparatus in accordance with claim 3 and further including
a third enclosure capable of communication with said second enclosure;
heating means in said third enclosure for heating said article and said material to a pre-heat temperature above said second temperature;
said movable means inserting said article into said third enclosure before sequentially inserting said article into said second and said first enclosures to heat said article to said pre-heat temperature to prevent vapors from said second body of saturated vapors from condensing thereon;
said movable means further moving said article into said third enclosure after sequentially removing said article from said first and said second enclosures to heat said article to said pre-heat temperature to vaporize any condensed vapors from said second body of saturated vapors which are present on said article.

5. An apparatus in accordance with claim 4 wherein said second closure means permits communication between or closure of communication between said second and third enclosures; and further including
third closure means for permitting communications between or closure of communication between said third enclosure and the ambient atmosphere.

6. An apparatus in accordance with claim 5 wherein said heating means in said third enclosure includes
radiant heating means mounted in said third enclosure; and
fan means for circulating the radiant heat from said radiant heating means in said third enclosure.

7. An apparatus in accordance with claim 6 and further including
cooling means in said third enclosure for condensing vapors from said second body of saturated vapors which are present in said third enclosure when said enclosures are in communication, said condensed vapors returning to said second enclosure from said third enclosure.

8. An apparatus in accordance with claim 7 and further including
first means for conveying liquid from said second reservoir into said first reservoir, said second liquid present in said drained liquid thereby being heated to its said boiling point temperature to form vapors of said second liquid, said vapors returning to said second enclosure when said first and second enclosures are in communication.

9. An apparatus in accordance with claim 8 and further including
second means for conveying liquid from said first reservoir into a cooling chamber to cool said conveyed liquid and to solidify any excess of said material present in said conveyed liquid;
means for filtering said solidified material from said cooled liquid; and
means for returning said filtered and cooled liquid to said first reservoir.

10. An apparatus in accordance with claim 1 and further including
means in said second enclosure for containing a distillate reservoir of said second liquid;
means in said second enclosure for conveying a portion of said condensed vapors of said second body of saturated vapor to said distillate reservoir; and
means for rinsing said article with said second liquid from said distillate reservoir thereof when said article has been moved into said second enclosure from said first enclosure to remove said first liquid and said material from said article.

11. An apparatus in accordance with claim 10 wherein said rinsing means includes
means for spraying said second liquid on to said article; and
pressure means for conveying said second liquid from said distillate reservoir thereof to said spraying means.

* * * * *